United States Patent
Kuo et al.

(10) Patent No.: US 12,356,064 B2
(45) Date of Patent: Jul. 8, 2025

(54) MEASUREMENT ASSISTANCE SYSTEM AND METHOD

(71) Applicant: National Kaohsiung University of Science and Technology, Kaohsiung (TW)

(72) Inventors: Chun-Chih Kuo, Kaohsiung (TW); Chia-Hung Chang, Kaohsiung (TW); Bo-Yun Hou, Kaohsiung (TW); Cheng-Yu Yang, Kaohsiung (TW)

(73) Assignee: NATIONAL KAOHSIUNG UNIVERSITY OF SCIENCE AND TECHNOLOGY, Kaohsiung (TW)

( * ) Notice: Subject to any disclaimer, the term of this patent is extended or adjusted under 35 U.S.C. 154(b) by 348 days.

(21) Appl. No.: 18/073,617

(22) Filed: Dec. 2, 2022

(65) Prior Publication Data

US 2024/0187722 A1   Jun. 6, 2024

(51) Int. Cl.
*H04N 23/61* (2023.01)
*G03B 17/56* (2021.01)
*G06F 18/213* (2023.01)
*H04N 23/90* (2023.01)

(52) U.S. Cl.
CPC ............ *H04N 23/61* (2023.01); *G03B 17/56* (2013.01); *G06F 18/213* (2023.01); *H04N 23/90* (2023.01)

(58) Field of Classification Search
CPC ........ H04N 23/61; H04N 23/90; G03B 17/56; G06F 18/213; G06V 10/82; G06V 40/10; B25J 9/0093; B25J 9/1697; B25J 9/1689; B25J 19/023; G06T 17/00; G06T 19/006; G06T 7/70; G06T 2207/10028; G06T 2207/30196; G06T 7/593; G06T 7/60
See application file for complete search history.

(56) References Cited

U.S. PATENT DOCUMENTS

| 11,461,584 B2* | 10/2022 | Namiki | G06F 17/18 |
| 11,657,644 B2* | 5/2023 | Hougen | G06T 7/60 |
| | | | 348/77 |
| 11,734,954 B2* | 8/2023 | Zhao | G06V 40/171 |
| | | | 382/118 |
| 2013/0100282 A1* | 4/2013 | Siercks | G01B 11/25 |
| | | | 348/135 |
| 2013/0101205 A1* | 4/2013 | Wu | G06V 10/245 |
| | | | 382/145 |

(Continued)

*Primary Examiner* — Michael S Osinski
(74) *Attorney, Agent, or Firm* — WPAT, PC

(57) ABSTRACT

A measurement assistance system and method are provided. The measurement assistance system includes: a measurement platform, having an operation area configured for a to-be-measured object and a measurement tool to be placed; a camera, arranged on the measurement platform and configured to obtain a measurement image; and a server module, electrically connected to the camera and configured to execute a measurement tool identification program, a measurement part identification program, and a measurement posture identification program according to the measurement image, and determine whether a measurement tool appearance image, a measurement part image, and a measurement posture image are correct. The server module has a processing unit. When the measurement tool appearance image, the measurement part image, and the measurement posture image are all correct, a measurement result is generated according to measurement data.

18 Claims, 4 Drawing Sheets

(56) References Cited

U.S. PATENT DOCUMENTS

| | | | |
|---|---|---|---|
| 2015/0314442 A1* | 11/2015 | Boca | B25J 9/1697 |
| | | | 700/259 |
| 2018/0108145 A1* | 4/2018 | Miura | H04N 13/344 |
| 2018/0336733 A1* | 11/2018 | Koga | G06T 7/60 |
| 2022/0297958 A1* | 9/2022 | Moreno | B25J 13/08 |
| 2022/0315352 A1* | 10/2022 | Sun | B65G 47/69 |
| 2022/0339728 A1* | 10/2022 | Okizaki | B23K 9/025 |
| 2022/0348409 A1* | 11/2022 | Sun | B07C 5/362 |
| 2022/0405502 A1* | 12/2022 | Wang | G06V 40/103 |
| 2023/0172438 A1* | 6/2023 | Usui | A61B 34/25 |
| | | | 606/1 |
| 2023/0331498 A1* | 10/2023 | Hau | B25J 9/0093 |
| 2024/0033930 A1* | 2/2024 | Narasaki | G06T 17/00 |
| 2024/0066711 A1* | 2/2024 | D'Amelio | B25J 9/0084 |
| 2024/0082976 A1* | 3/2024 | Haimer | G01B 11/005 |
| 2024/0083038 A1* | 3/2024 | Nakai | B25J 9/1697 |
| 2024/0104120 A1* | 3/2024 | Dowie | H04W 4/023 |
| 2024/0265641 A1* | 8/2024 | Jeong | G06T 19/006 |

* cited by examiner

MEASUREMENT ASSISTANCE SYSTEM AND METHOD

BACKGROUND

Technical Field

The present invention relates to a measurement assistance system and method, and in particular, to a measurement assistance system and method applicable to a quality control measurement system, through which a to-be-measured part of a component designated by a user may be identified and correctness of the identification may be determined.

Related Art

Currently, a visual identification system is mostly used for product defect detection and product size detection, but the visual identification system on the entire production line is expensive. For components in the dimension more than 2D, the measurement is inaccurate and difficult, and for high-precision products of small scale production, time needs to be spent in adjusting and correcting the identification system. Compared with the current quality control software, current quality control measurement software can directly input data of a measurement tool into the quality control software and provide quite rich quality control charts to perform analysis on the process capability of the production line. Quality control means performing data analysis based on a same data source and ensuring the accuracy of data before input. The accuracy indicates whether a measured part of a component and a type of a measurement tool are correct, whether a hand holds the measurement tool, and the like. Currently, the measurement quality control software cannot perform data determination on the component part, the type of the measurement tool, and hand holding. These errors may reduce the effectiveness of quality control.

SUMMARY

The present invention provides a measurement assistance system and method, and is intended to detect data accuracy during measurement of components by a quality control staff based on a visual identification assistance system.

A measurement assistance system of the present invention includes: a measurement platform, having an operation area configured for a to-be-measured object and a measurement tool to be placed; at least one camera, arranged on the measurement platform and configured to obtain a measurement image; and a server module, electrically connected to the at least one camera, and configured to: execute a measurement tool identification program, a measurement part identification program, and a measurement posture identification program according to the measurement image through a standard measurement tool appearance model, a standard measurement part model, and a standard measurement posture model, obtain a measurement tool appearance image corresponding to the at least one measurement tool, a measurement part image of the to-be-measured object, and a measurement posture image of a measurer, and determine whether the measurement tool appearance image, the measurement part image, and the measurement posture image are correct. The server module has a processing unit. When the measurement tool appearance image, the measurement part image, and the measurement posture image are all correct, a measurement result is generated according to measurement data. The standard measurement tool appearance model, the standard measurement part model, and the standard measurement posture model are trained by a pre-built deep learning neural network framework, and the deep learning neural network framework includes a TensorFlow object detection algorithm, a Hu Moment algorithm, a TensorFlow CNN algorithm, and MediaPipe Hand algorithm.

In an embodiment of the present invention, the measurement assistance system further comprises a display module, and the display module is located in the operation area and is configured to display measurement information.

In an embodiment of the present invention, the measurement information comprises a designated measurement tool, a measurement part, and the measurement result.

In an embodiment of the present invention, the measurement assistance system further comprises an input module, and the input module is configured to obtain the measurement data.

In an embodiment of the present invention, the measurement assistance system further comprises a determining module, and the determining module is configured to determine whether the measurement data is within a preset threshold range.

In an embodiment of the present invention, the measurement tools comprise a wired measurement tool and/or a wireless measurement tool, and the wireless measurement tool has a corresponding measurement data receiving unit.

In an embodiment of the present invention, the standard measurement tool appearance model is an artificial neural network model trained through deep learning by using the TensorFlow object detection algorithm as the deep learning neural network framework.

In an embodiment of the present invention, the standard measurement part model is an artificial neural network model trained through deep learning by using the Hu Moment algorithm and the TensorFlow CNN algorithm as the deep learning neural network framework.

In an embodiment of the present invention, the standard measurement posture model uses the MediaPipe Hand algorithm for hand identification.

The present invention further includes a measurement assistance method, applicable to the foregoing measurement assistance system. The measurement assistance method includes the following steps: displaying measurement information through a display module; continuously obtaining, by a server module, a measurement image of an operation area by using at least one camera; executing a measurement tool identification program according to the measurement image through a standard measurement tool appearance model, obtaining a measurement tool appearance image, and comparing the measurement tool appearance image with the measurement information; executing a measurement part identification program through a standard measurement part model according to the measurement image, obtaining a measurement part image, and comparing the measurement part image with the measurement information when the measurement tool appearance image is correct; executing a measurement posture identification program through a standard measurement posture model according to the measurement image, obtaining a measurement posture image, and comparing the measurement posture image with the measurement information when the measurement part image is correct; obtaining measurement data through an input module when the measurement posture image is correct; determining whether the measurement data is within a preset threshold range through a determining module; and generating a measurement result according to the measurement data through a processing unit when the measurement data is within the preset threshold range.

In an embodiment of the present invention, the measurement tools comprise a wired measurement tool and/or a wireless measurement tool, and the wireless measurement tool has a corresponding measurement data receiving unit.

In an embodiment of the present invention, the standard measurement tool appearance model is an artificial neural network model trained through deep learning by using the TensorFlow object detection algorithm as the deep learning neural network framework.

In an embodiment of the present invention, the standard measurement part model is an artificial neural network model trained through deep learning by using the Hu Moment algorithm and the TensorFlow CNN algorithm as the deep learning neural network framework.

In an embodiment of the present invention, the standard measurement posture model uses the MediaPipe Hand algorithm for hand identification.

The effects of the present invention are as follows. Data accuracy during measurement of components by a quality control staff is detected based on a visual identification assistance system. The assistance system is used for a measurement system on site to perform visual identification on the part of the component measured by a person on site, the measurement tool, and the posture, to detect the correctness through machine vision identification. Compared with a traditional measurement system, a user performs measurement based on a set component part diagram. If the measured pars are excessively similar, the measurement staff may measure an erroneous part, or the measurement staff performs measurement without following the specification and manually inputs erroneous data directly. To improve the defect, the measurement assistance system integrates the visual identification with the measurement system, and determines the component part, the measurement tool, the posture, and the like through visual identification.

DETAILED DESCRIPTION

Figure 1:
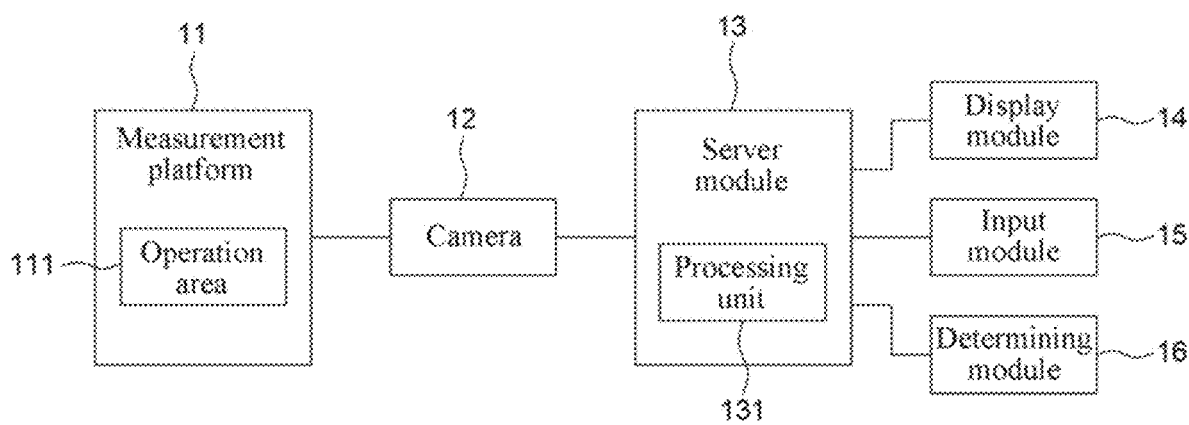
FIG. 1 is a block diagram of a measurement assistance system according to the present invention.

In order to make the above features and advantages of the present invention more clearly understood, embodiments are specifically given below in combination with the accompanying drawings. In addition to these detailed descriptions, the present invention may also be widely implemented in other embodiments. Any easy substitution, modification, and equivalent changes of the embodiments are all included in the scope of the present invention, and the scope of the patent application shall prevail. In the description of the specification, in order to make a reader have relatively complete understanding of the present invention, a plurality of specific details is provided. However, it is possible that the present invention may be implemented with some or all of the specific details being omitted. In addition, well-known steps or elements have not been described in detail to avoid unnecessary limitations on the present invention. The same or similar elements in the figures are represented by the same or similar reference numerals. It is particularly noted that the figures are merely for illustration, and do not represent actual sizes or quantities of elements. Some details may not be completely drawn to simplify the drawings. A detailed description is given as follows.

Refer to FIG. 1. FIG. 1 is a block diagram of a measurement assistance system according to the present invention. A measurement assistance system of the present invention includes: a measurement platform 11, having an operation area 111 for a to-be-measured object and a measurement tool to be placed; at least one camera 12, arranged on the measurement platform 11 and configured to obtain a measurement image; and a server module 13, electrically connected to the at least one camera 12, and configured to: execute a measurement tool identification program, a measurement part identification program, and a measurement posture identification program according to the measurement image through a standard measurement tool appearance model, a standard measurement part model, and a standard measurement posture model, obtain a measurement tool appearance image corresponding to the at least one measurement tool, a measurement part image of the to-be-measured object, and a measurement posture image of a measurer, and determine whether the measurement tool appearance image, the measurement part image, and the measurement posture image are correct. The server module 13 has a processing unit 131. When the measurement tool appearance image, the measurement part image, and the measurement posture image are all correct, a measurement result is generated according to measurement data. The standard measurement tool appearance model, the standard measurement part model, and the standard measurement posture model are trained by a pre-built deep learning neural network framework, and the deep learning neural network framework includes a TensorFlow object detection algorithm, a Hu Moment algorithm, a TensorFlow CNN algorithm, and a MediaPipe Hand algorithm.

In this embodiment, the measurement assistance system further comprises a display module 14, and the display module 14 is located in the operation area 111 and is configured to display measurement information.

The measurement information comprises a designated measurement tool, a measurement part, and the measurement result.

In this embodiment, the measurement assistance system further includes a signal conversion apparatus. The signal conversion apparatus is connected to the server module 13 through the Internet, and the signal conversion apparatus is connected to the display module 14 in a wired manner or a wireless manner.

The display module 14 may be but not limited to an intelligent mobile phone, a tablet computer, a desktop computer, or a notebook computer.

In this embodiment, the measurement assistance system further comprises an input module 15, and the input module 15 is configured to obtain the measurement data.

In this embodiment, the measurement assistance system further comprises a determining module 16, and the determining module 16 is configured to determine whether the measurement data is within a preset threshold range.

When the measurement data exceeds the preset threshold range, a notification signal is transmitted by using a warning unit.

In this embodiment, the measurement tools comprise a wired measurement tool and/or a wireless measurement tool, and the wireless measurement tool has a corresponding measurement data receiving unit.

In this embodiment, the standard measurement tool appearance model is an artificial neural network model trained through deep learning by using the TensorFlow object detection algorithm as the deep learning neural network framework.

The TensorFlow object detection algorithm is an open source software library applied to machine learning, and TensorFlow provides a variety of AI-related models.

The standard measurement tool appearance model performs object identification through the TensorFlow object detection algorithm, and mainly identifies the measurement tools such as a vernier caliper, a separated card, and a height master, and a part on the measurement tool contacting the measured component.

In this embodiment, the standard measurement part model is an artificial neural network model trained through deep learning by using the Hu Moment algorithm and the TensorFlow CNN algorithm as the deep learning neural network framework.

The Hu Moment algorithm uses seven invariants of an object in a photo. The seven invariants are improved from standard geometric moments, so that the moments of the object still remain unchanged after being rotated, moved, scaled, mirrored, and the like. Compared with the original standard moments, the Hu Moment is more suitable for describing and comparing a similarity of objects than the original standard moments. The seven invariants are shown in the figure bellow.

$$h_0 = \eta_{20} + \eta_{02}$$

$$h_1 = (\eta_{20} + \eta_{02})^2 + 4\eta_{11}^2$$

$$h_2 = (\eta_{30} - 3\eta_{12})^2 + (3\eta_{21} - \eta_{03})^2$$

$$h_3 = (\eta_{30} + \eta_{12})^2 + (\eta_{21} + \eta_{03})^2$$

$$h_4 = (\eta_{30} - 3\eta_{12})(\eta_{30} - \eta_{12})[(\eta_{30} + \eta_{12})^2 - 3(\eta_{21} + \eta_{03})^2] + (3\eta_{21} - \eta_{03})[3\eta_{30} + \eta_{12})^2 - (\eta_{21} + \eta_{03})^2]$$

$$h_5 = (\eta_{20}\eta_{02})[(\eta_{30} - \eta_{12})^2 - (\eta_{21} + \eta_{03})^2 + 4\eta_{11}(\eta_{30} + \eta_{12})(\eta_{21} + \eta_{03})]$$

$$h_6 = (3\eta_{21} - \eta_{03})(\eta_{30} + \eta_{12})[(\eta_{30} + \eta_{12})^2 - 3(\eta_{21} + \eta_{03})^2] + (\eta_{30} - 3\eta_{12})[3(\eta_{30} + \eta_{12})^2 - (\eta_{21} + \eta_{03})^2]$$

The Hu Moment remains the same after the object is rotated, translated, and scaled, and may be used for object shape identification.

The standard measurement part model constructed through the Hu Moment algorithm and the TensorFlow CNN algorithm may use a picture of the component part. The vernier caliper is used as an example. Different parts on the component have different features. A picture of a part contacted by a main scale is captured for identification.

The measurement part image means an image where the measurement tool touches a to-be-measured object.

In this embodiment, the standard measurement posture model uses the MediaPipe Hand algorithm for hand identification.

The measurement posture image includes a hand posture and a finger angle.

Figure 1A:
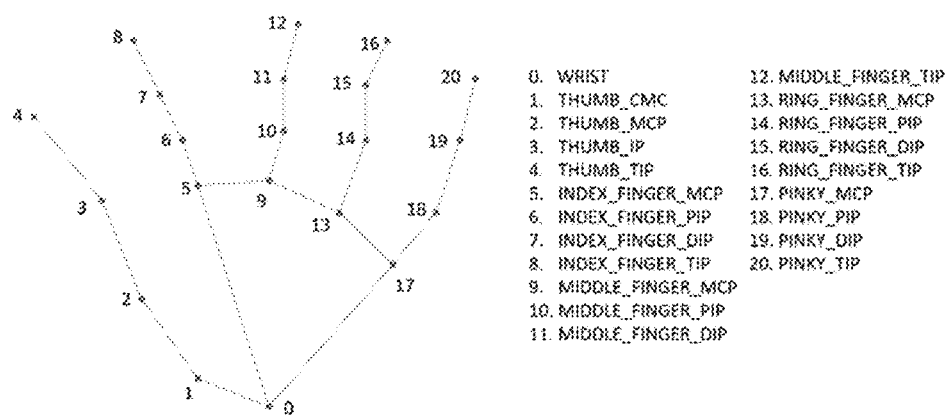
FIG. 1A shows a MediaPipe Hand algorithm used for dividing a hand portion into 21 feature points.

The MediaPipe Hand algorithm is used for dividing the hand portion into 21 feature points as shown in the FIG. 1A. The hand posture and the finger angle may be obtained from the feature points, and it is determined based on the hand posture whether to grasp the measurement tool.

Figure 2:
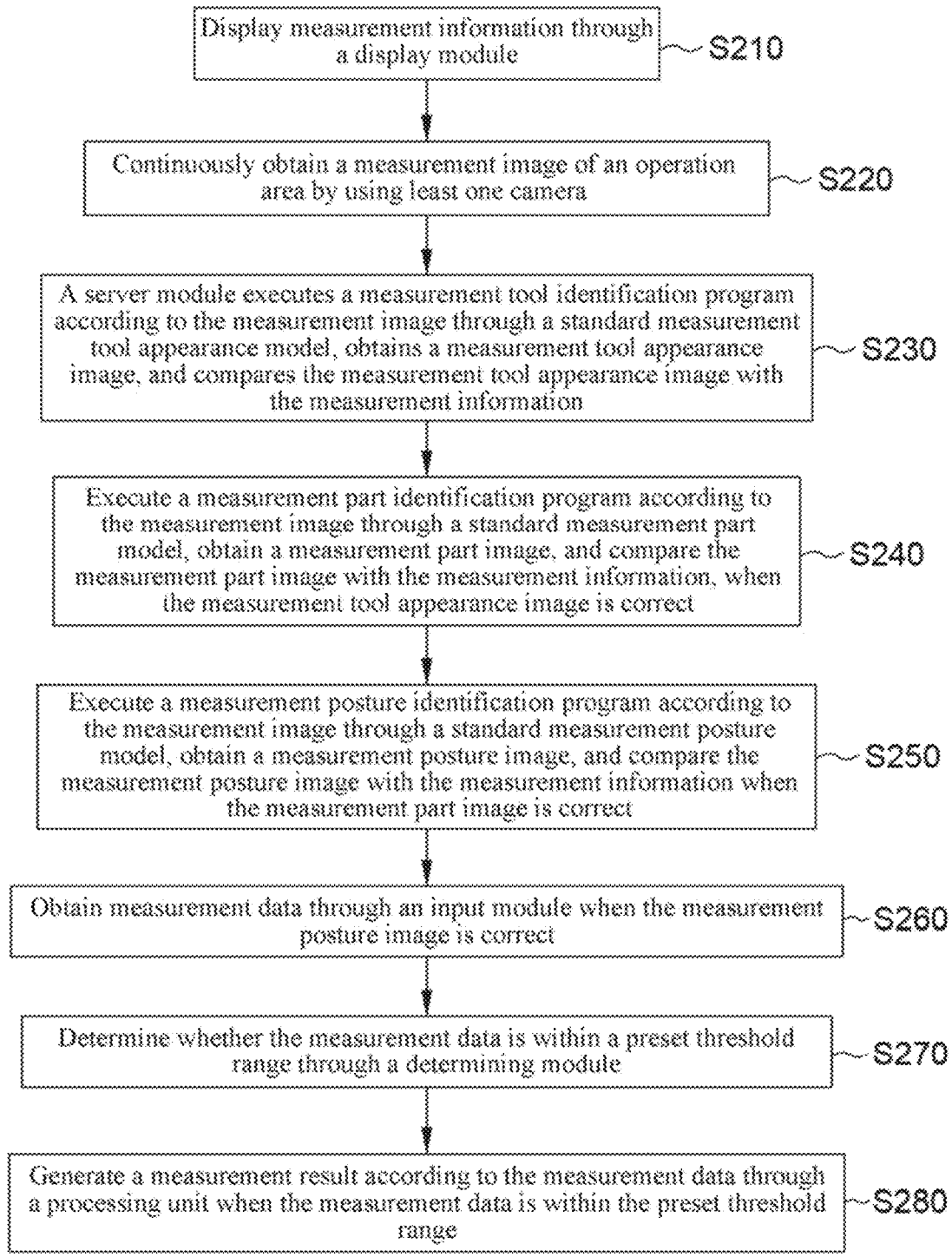
FIG. 2 is a flowchart of steps of a measurement assistance method according to the present invention.

Refer to FIG. 2. FIG. 2 is a flowchart of steps of a measurement assistance method according to the present invention. The measurement assistance method in FIG. 2 is applicable to a measurement assistance system. The measurement assistance method includes the following steps.

Step S210: Display measurement information through a display module.

Step S220: Continuously obtain a measurement image of an operation area by using at least one camera.

Step S230: A server module executes a measurement tool identification program according to the measurement image through a standard measurement tool appearance model, obtains a measurement tool appearance image, and compares the measurement tool appearance image with the measurement information.

Step S240: Execute a measurement part identification program according to the measurement image through a standard measurement part model, obtain a measurement part image, and compare the measurement part image with the measurement information when the measurement tool appearance image is correct.

Step S250: Execute a measurement posture identification program according to the measurement image through a standard measurement posture model, obtain a measurement posture image, and compare the measurement posture image with the measurement information when the measurement part image is correct.

Step S260: When the measurement posture image is correct, measurement data is obtained through an input module.

Step S270: A determining module determines whether the measurement data is within a preset threshold range.

Step S280: When the measurement data is within the preset threshold range, a measurement result is generated according to the measurement data through a processing unit.

In this embodiment, the measurement tools comprise a wired measurement tool and/or a wireless measurement tool, and the wireless measurement tool has a corresponding measurement data receiving unit.

In this embodiment, the standard measurement tool appearance model is an artificial neural network model trained through deep learning by using the TensorFlow object detection algorithm as the deep learning neural network framework.

In this embodiment, the standard measurement part model is an artificial neural network model trained through deep learning by using the Hu Moment algorithm and the TensorFlow CNN algorithm as the deep learning neural network framework.

In this embodiment, the standard measurement posture model uses the MediaPipe Hand algorithm for hand identification.

Figure 3:
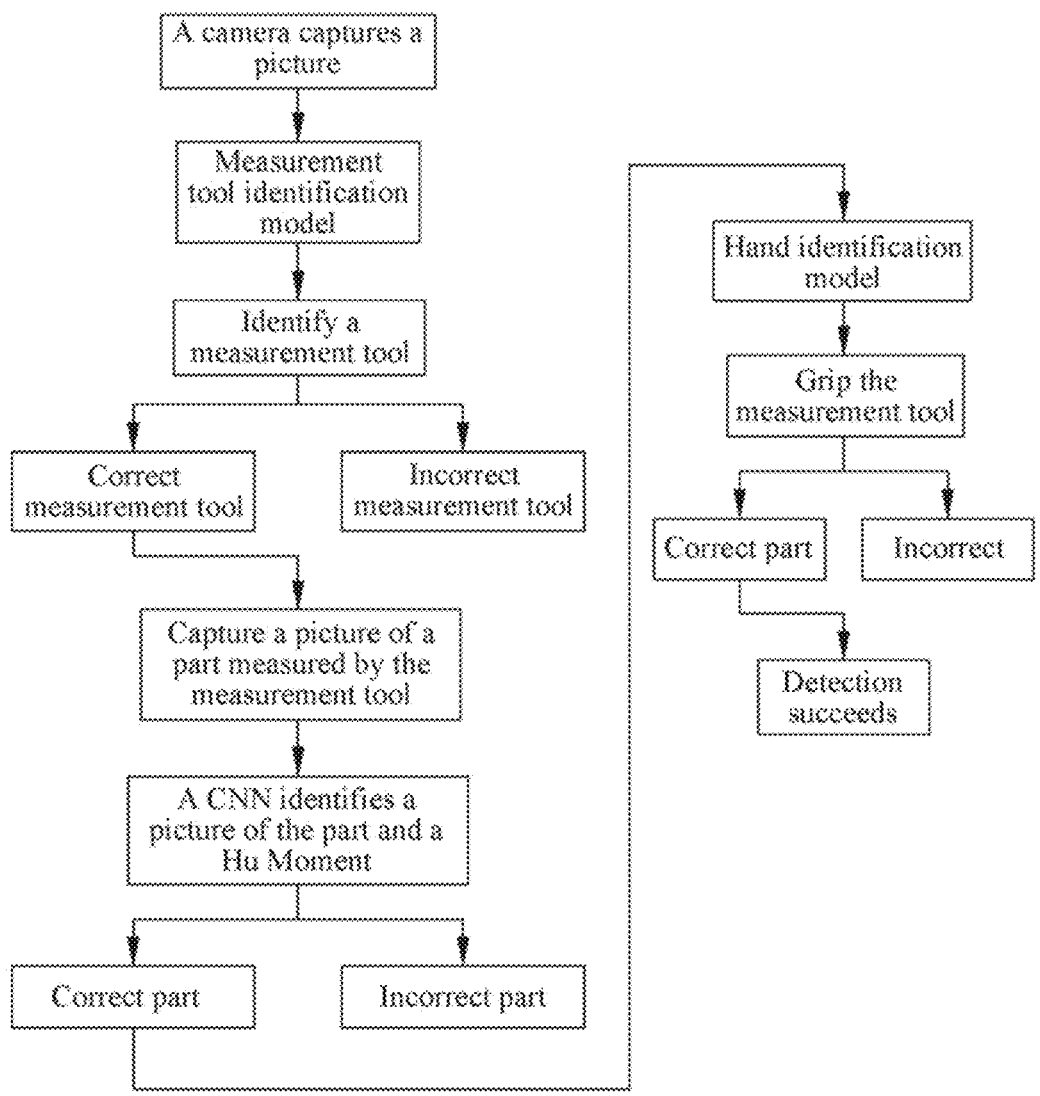
FIG. 3 is a schematic diagram of a determining process of an embodiment of a measurement assistance method according to the present invention.

Refer to FIG. 3. FIG. 3 is a schematic diagram of a determining process of an embodiment of a measurement assistance method according to the present invention. In FIG. 3, the determining process of the measurement assistance system is as follows. The camera first captures a picture during measurement by a measurer on a measurement platform, and identification is performed according to a measurement tool appearance image through a measurement tool identification model, to determine whether the measurement tool is correct. If the measurement tool is incorrect, detection fails. When the detection succeeds, a next stage starts. A picture of the part measured on the measurement tool is captured, and identification is performed by comparing the measurement part image with the standard measurement part model constructed by the CNN through a Hu moment calculation value. If the identification fails, the detection fails, and when the detection succeeds, a next stage starts. Measurement posture images of hand holding and hand identification are captured. It is identified whether a hand holds the measurement tool through a standard measurement posture model. If the identification fails, the detection fails, and if the identification succeeds, the detection succeeds. The successful detection indicates that a user uses a correct measurement tool and a correct part on a measured component, and it is determined that the hand grasps the correct measurement tool.

In this embodiment, after all detections succeed, and measurement data is transmitted to the server module by using an input module, a measurement result is generated.

It is determined whether the measurement data is within a preset threshold range through a determining module.

Based on the above, the effects of the present invention are as follows. Data accuracy during measurement of components by a quality control staff is detected based on a visual identification assistance system. The assistance system is used for a measurement system on site to perform visual identification on the part of the component measured by a person on site, the measurement tool, and the posture, to detect the correctness through machine vision identification. Compared with a traditional measurement system, a user performs measurement based on a set component part diagram. If the measured parts are excessively similar, the measurement staff may measure an erroneous part, or the measurement staff performs measurement without following the specification and manually inputs erroneous data directly. To improve the defect, the measurement assistance system integrates the visual identification with the measurement system, and determines the component part, the measurement tool, the posture, and the like through visual identification.

Although the present invention is disclosed above by using the above embodiments, the embodiments are not intended to limit the present invention. Equivalent substitutions of changes and refinements made by any person skilled in the art without departing from the spirit and scope of the present invention shall still fall within the protect scope of the present invention.

What is claimed is:

1. A measurement assistance system, comprising:
a measurement platform, having an operation area configured for a to-be-measured object and at least one measurement tool to be placed;
at least one camera, arranged on the measurement platform and configured to obtain a measurement image; and
a server module, electrically connected to the at least one camera and configured to: execute a measurement tool identification program, a measurement part identification program, and a measurement posture identification program according to the measurement image through a standard measurement tool appearance model, a standard measurement part model, and a standard measurement posture model, obtain a measurement tool appearance image corresponding to the at least one measurement tool, a measurement part image of the to-be-measured object, and a measurement posture image of a measurer, and determine whether the measurement tool appearance image, the measurement part image, and the measurement posture image are correct, wherein
the server module has a processing unit, and when the measurement tool appearance image, the measurement part image, and the measurement posture image are all correct, a measurement result is generated according to measurement data; and
the standard measurement tool appearance model, the standard measurement part model, and the standard measurement posture model are trained through a pre-built deep learning neural network framework, wherein the deep learning neural network framework comprises a TensorFlow object detection algorithm, a Hu Moment algorithm, a TensorFlow CNN algorithm, and a MediaPipe Hand algorithm.

2. The measurement assistance system according to claim 1, further comprising a display module, wherein the display module is located in the operation area and is configured to display measurement information.

3. The measurement assistance system according to claim 2, wherein the measurement information comprises a designated measurement tool, a measurement part, and the measurement result.

4. The measurement assistance system according to claim 1, further comprising an input module, wherein the input module is configured to obtain the measurement data.

5. The measurement assistance system according to claim 1, further comprising a determining module, wherein the determining module is configured to determine whether the measurement data is within a preset threshold range.

6. The measurement assistance system according to claim 1, wherein the measurement tools comprise a wired measurement tool and/or a wireless measurement tool, and the wireless measurement tool has a corresponding measurement data receiving unit.

7. The measurement assistance system according to claim 1, wherein the standard measurement tool appearance model is an artificial neural network model trained through deep learning by using the TensorFlow object detection algorithm as the deep learning neural network framework.

8. The measurement assistance system according to claim 1, wherein the standard measurement part model is an artificial neural network model trained through deep learning by using the Hu Moment algorithm and the TensorFlow CNN algorithm as the deep learning neural network framework.

9. The measurement assistance system according to claim 1, wherein the standard measurement posture model uses the MediaPipe Hand algorithm for hand identification.

10. A measurement assistance method, applicable to the measurement assistance system according to claim 1, wherein the measurement assistance method comprises the following steps:
displaying measurement information through a display module;
continuously obtaining a measurement image of an operation area by using at least one camera;
executing, by a server module, a measurement tool identification program according to the measurement image through a standard measurement tool appearance model, obtaining a measurement tool appearance image, and comparing the measurement tool appearance image with the measurement information;
executing a measurement part identification program through a standard measurement part model according to the measurement image, obtaining a measurement part image, and comparing the measurement part image with the measurement information, when the measurement tool appearance image is correct;

executing a measurement posture identification program through a standard measurement posture model according to the measurement image, obtaining a measurement posture image, and comparing the measurement posture image with the measurement information, when the measurement part image is correct;

obtaining measurement data through an input module when the measurement posture image is correct;

determining whether the measurement data is within a preset threshold range through a determining module; and generating a measurement result through a processing unit according to the measurement data when the measurement data is within the preset threshold range.

11. A measurement assistance method, applicable to the measurement assistance system according to claim 2, wherein the measurement assistance method comprises the following steps:

displaying measurement information through a display module;

continuously obtaining a measurement image of an operation area by using at least one camera;

executing, by a server module, a measurement tool identification program according to the measurement image through a standard measurement tool appearance model, obtaining a measurement tool appearance image, and comparing the measurement tool appearance image with the measurement information;

executing a measurement part identification program through a standard measurement part model according to the measurement image, obtaining a measurement part image, and comparing the measurement part image with the measurement information, when the measurement tool appearance image is correct;

executing a measurement posture identification program through a standard measurement posture model according to the measurement image, obtaining a measurement posture image, and comparing the measurement posture image with the measurement information, when the measurement part image is correct;

obtaining measurement data through an input module when the measurement posture image is correct;

determining whether the measurement data is within a preset threshold range through a determining module; and generating a measurement result through a processing unit according to the measurement data when the measurement data is within the preset threshold range.

12. A measurement assistance method, applicable to the measurement assistance system according to claim 3, wherein the measurement assistance method comprises the following steps:

displaying measurement information through a display module;

continuously obtaining a measurement image of an operation area by using at least one camera;

executing, by a server module, a measurement tool identification program according to the measurement image through a standard measurement tool appearance model, obtaining a measurement tool appearance image, and comparing the measurement tool appearance image with the measurement information;

executing a measurement part identification program through a standard measurement part model according to the measurement image, obtaining a measurement part image, and comparing the measurement part image with the measurement information, when the measurement tool appearance image is correct;

executing a measurement posture identification program through a standard measurement posture model according to the measurement image, obtaining a measurement posture image, and comparing the measurement posture image with the measurement information, when the measurement part image is correct;

obtaining measurement data through an input module when the measurement posture image is correct;

determining whether the measurement data is within a preset threshold range through a determining module; and generating a measurement result through a processing unit according to the measurement data when the measurement data is within the preset threshold range.

13. A measurement assistance method, applicable to the measurement assistance system according to claim 4, wherein the measurement assistance method comprises the following steps:

displaying measurement information through a display module;

continuously obtaining a measurement image of an operation area by using at least one camera;

executing, by a server module, a measurement tool identification program according to the measurement image through a standard measurement tool appearance model, obtaining a measurement tool appearance image, and comparing the measurement tool appearance image with the measurement information;

executing a measurement part identification program through a standard measurement part model according to the measurement image, obtaining a measurement part image, and comparing the measurement part image with the measurement information, when the measurement tool appearance image is correct;

executing a measurement posture identification program through a standard measurement posture model according to the measurement image, obtaining a measurement posture image, and comparing the measurement posture image with the measurement information, when the measurement part image is correct;

obtaining measurement data through an input module when the measurement posture image is correct;

determining whether the measurement data is within a preset threshold range through a determining module; and generating a measurement result through a processing unit according to the measurement data when the measurement data is within the preset threshold range.

14. A measurement assistance method, applicable to the measurement assistance system according to claim 5, wherein the measurement assistance method comprises the following steps:

displaying measurement information through a display module;

continuously obtaining a measurement image of an operation area by using at least one camera;

executing, by a server module, a measurement tool identification program according to the measurement image through a standard measurement tool appearance model, obtaining a measurement tool appearance image, and comparing the measurement tool appearance image with the measurement information;

executing a measurement part identification program through a standard measurement part model according to the measurement image, obtaining a measurement part image, and comparing the measurement part image with the measurement information, when the measurement tool appearance image is correct;

executing a measurement posture identification program through a standard measurement posture model according to the measurement image, obtaining a measurement posture image, and comparing the measurement posture image with the measurement information, when the measurement part image is correct;

obtaining measurement data through an input module when the measurement posture image is correct;

determining whether the measurement data is within a preset threshold range through a determining module; and generating a measurement result through a processing unit according to the measurement data when the measurement data is within the preset threshold range.

15. A measurement assistance method, applicable to the measurement assistance system according to claim 6, wherein the measurement assistance method comprises the following steps:

displaying measurement information through a display module;

continuously obtaining a measurement image of an operation area by using at least one camera;

executing, by a server module, a measurement tool identification program according to the measurement image through a standard measurement tool appearance model, obtaining a measurement tool appearance image, and comparing the measurement tool appearance image with the measurement information;

executing a measurement part identification program through a standard measurement part model according to the measurement image, obtaining a measurement part image, and comparing the measurement part image with the measurement information, when the measurement tool appearance image is correct;

executing a measurement posture identification program through a standard measurement posture model according to the measurement image, obtaining a measurement posture image, and comparing the measurement posture image with the measurement information, when the measurement part image is correct;

obtaining measurement data through an input module when the measurement posture image is correct;

determining whether the measurement data is within a preset threshold range through a determining module; and generating a measurement result through a processing unit according to the measurement data when the measurement data is within the preset threshold range.

16. A measurement assistance method, applicable to the measurement assistance system according to claim 7, wherein the measurement assistance method comprises the following steps:

displaying measurement information through a display module;

continuously obtaining a measurement image of an operation area by using at least one camera;

executing, by a server module, a measurement tool identification program according to the measurement image through a standard measurement tool appearance model, obtaining a measurement tool appearance image, and comparing the measurement tool appearance image with the measurement information;

executing a measurement part identification program through a standard measurement part model according to the measurement image, obtaining a measurement part image, and comparing the measurement part image with the measurement information, when the measurement tool appearance image is correct;

executing a measurement posture identification program through a standard measurement posture model according to the measurement image, obtaining a measurement posture image, and comparing the measurement posture image with the measurement information, when the measurement part image is correct;

obtaining measurement data through an input module when the measurement posture image is correct;

determining whether the measurement data is within a preset threshold range through a determining module; and generating a measurement result through a processing unit according to the measurement data when the measurement data is within the preset threshold range.

17. A measurement assistance method, applicable to the measurement assistance system according to claim 8, wherein the measurement assistance method comprises the following steps:

displaying measurement information through a display module;

continuously obtaining a measurement image of an operation area by using at least one camera;

executing, by a server module, a measurement tool identification program according to the measurement image through a standard measurement tool appearance model, obtaining a measurement tool appearance image, and comparing the measurement tool appearance image with the measurement information;

executing a measurement part identification program through a standard measurement part model according to the measurement image, obtaining a measurement part image, and comparing the measurement part image with the measurement information, when the measurement tool appearance image is correct;

executing a measurement posture identification program through a standard measurement posture model according to the measurement image, obtaining a measurement posture image, and comparing the measurement posture image with the measurement information, when the measurement part image is correct;

obtaining measurement data through an input module when the measurement posture image is correct;

determining whether the measurement data is within a preset threshold range through a determining module; and generating a measurement result through a processing unit according to the measurement data when the measurement data is within the preset threshold range.

18. A measurement assistance method, applicable to the measurement assistance system according to claim 9, wherein the measurement assistance method comprises the following steps:

displaying measurement information through a display module;

continuously obtaining a measurement image of an operation area by using at least one camera;

executing, by a server module, a measurement tool identification program according to the measurement image through a standard measurement tool appearance model, obtaining a measurement tool appearance image, and comparing the measurement tool appearance image with the measurement information;

executing a measurement part identification program through a standard measurement part model according to the measurement image, obtaining a measurement part image, and comparing the measurement part image with the measurement information, when the measurement tool appearance image is correct;

executing a measurement posture identification program through a standard measurement posture model according to the measurement image, obtaining a measurement posture image, and comparing the measurement posture image with the measurement information, when the measurement part image is correct;

obtaining measurement data through an input module when the measurement posture image is correct;

determining whether the measurement data is within a preset threshold range through a determining module; and generating a measurement result through a processing unit according to the measurement data when the measurement data is within the preset threshold range.

* * * * *